United States Patent [19]
Mori et al.

[11] Patent Number: 5,010,479
[45] Date of Patent: * Apr. 23, 1991

[54] INFORMATION PROCESSING AND STORAGE SYSTEM WITH SIGNAL TRANSMISSION LOOP LINE

[75] Inventors: Kinji Mori; Yuko Kunai, both of Kawasaki; Masakazu Akiyama, Katsuta; Tadaaki Kadoya, Narashino; Katsumi Kawano, Nerima; Shoji Miyamoto; Makoto Nohmi, both of Kawasaki; Sadanori Shingai, Yokohama; Hirokazu Ihara, Machida, all of Japan

[73] Assignee: Hitachi, Ltd., Tokyo, Japan

[*] Notice: The portion of the term of this patent subsequent to Aug. 9, 2005 has been disclaimed.

[21] Appl. No.: 158,698

[22] Filed: Feb. 22, 1988

Related U.S. Application Data

[63] Continuation of Ser. No. 498,553, May 26, 1983, Pat. No. 4,763,254.

[51] Int. Cl.⁵ .......................... G06F 3/00; G06F 3/04
[52] U.S. Cl. .................... 364/200; 364/248.6; 364/246; 364/238.8
[58] Field of Search ... 364/200 MS File, 900 MS File, 364/300; 340/825.5; 370/85.86

[56] References Cited

U.S. PATENT DOCUMENTS

| | | | |
|---|---|---|---|
| 3,278,904 | 10/1966 | Lekven | 364/200 |
| 3,328,566 | 6/1967 | Kinzie et al. | 364/200 |
| 3,328,772 | 6/1967 | Oeters | 364/200 |
| 3,404,377 | 10/1968 | Frankel | 364/200 |
| 3,641,508 | 2/1972 | Saltini | 364/200 |
| 3,678,462 | 7/1972 | Condon et al. | 364/200 |
| 4,136,384 | 1/1979 | Okada et al. | 364/200 |
| 4,432,054 | 2/1984 | Okada et al. | 364/200 |
| 4,468,733 | 8/1984 | Oka et al. | 364/200 |

Primary Examiner—Gareth D. Shaw
Assistant Examiner—J. Fairbanks
Attorney, Agent, or Firm—Antonelli, Terry, Stout & Kraus

[57] ABSTRACT

An information processing system includes a loop-shaped signal transmission line for transmitting data to be stored, a plurality of transmission control processors disposed around the transmission line, and information processing units for inputting and outputting data to and from the signal transmission line through the corresponding transmission control processors. Each of the transmission control processors is adapted to variably control the signal amplitude of data flowing around the signal transmission line in accordance with the utilization of the data in the corresponding information processing unit.

17 Claims, 7 Drawing Sheets

INFORMATION PROCESSING AND STORAGE SYSTEM WITH SIGNAL TRANSMISSION LOOP LINE

This is a continuation of U.S. application Ser. No. 498,553, filed May 26, 1983, now U.S. Pat. No. 4,763,254, issued Aug. 9, 1988.

BACKGROUND OF THE INVENTION

The present invention relates to an information processing system and more particularly to an information processing system which is improved so that information can be stored and read out without employing any addresses, and unnecessary information can be erased automatically leaving important information.

When storing information, it is necessary to store successively generated information within a memory medium by preserving information frequently used, and erasing information no longer used. When utilizing such information, in order to simplify processing, it is desired to permit the information to be extracted without any knowledge of the storage location thereof.

Hitherto, magnetic storage and the like have been employed as means for storing information. These storage means, however, have fixed information storage locations, hence the storage location of the information must be recognized beforehand when writing or reading it out. In addition, once information has been stored, there is no possibility of the information in the memory being gradually reduced unless the power source is turned off or all the information is erased together. In consequence, the amount of information increases disadvantageously, or when information is used by a plurality of processors, the control of information storage addresses and the coordination of contention between processors during the writing or reading out of information becomes unfavorably complicated. Moreover, when erasing information, since it is necessary to process each individual item of information to determine, when or whether it should be erased, as the quantity of information increases, the storage and processing thereof become large in quantity, as well as complicated.

SUMMARY OF THE INVENTION

Accordingly, a primary object of the invention it to provide an information processing system which is able to store and read out a message without any knowledge of the storage address of the information, and can control the quantity of stored data as appropriate, thereby overcoming the disadvantages of the prior art.

To this end, the invention is characterized in that a data transmission line is employed as a memory medium; after data is sent onto the transmission line, the data is kept circulating unchanged, and when necessary, a part of the circulating data can be extracted from the transmission line without addressing; it is possible to progressively reduce the amplitude of data of low utilization while the data is circulating around the transmission line; and it is possible to easily control the time period until the data is completely erased, by transferring the data between transmission lines providing different attenuation on which the data is circulated depending on the contents of the data, or the degree of importance thereof.

DETAILED DESCRIPTION OF THE PREFERRED EMBODIMENT

The invention will be described hereinunder with reference to an embodiment thereof.

Figure 1:
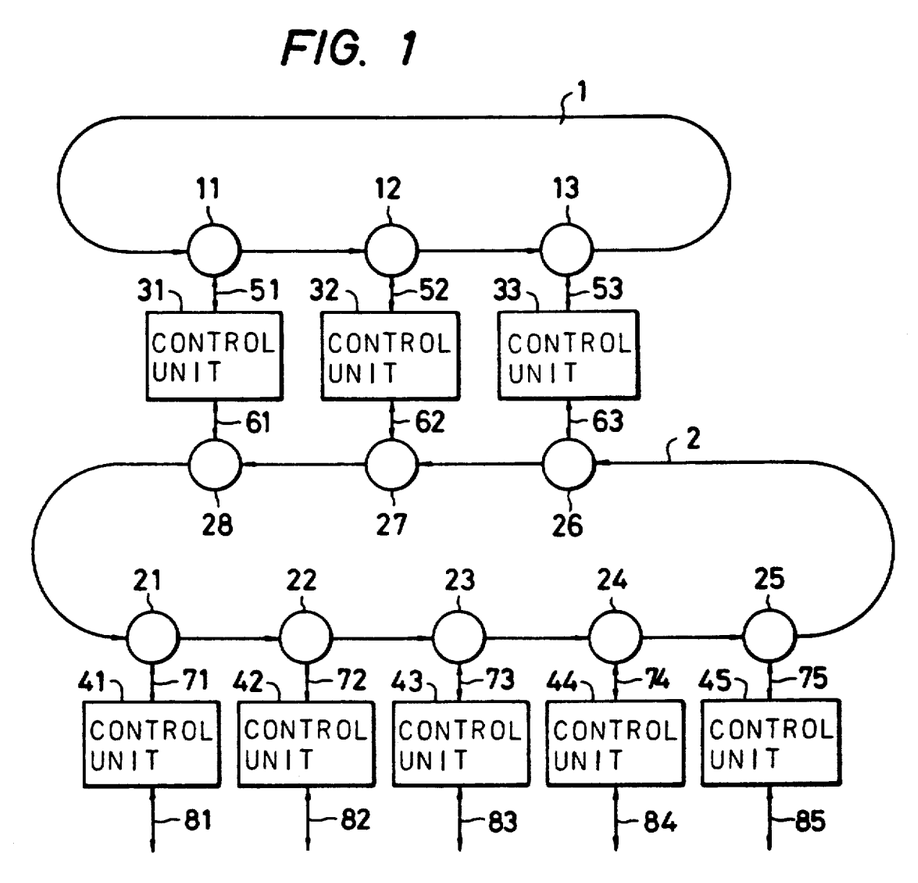
FIG. 1 shows the arrangement of the whole of an embodiment of an information processing system, in accordance with the invention.

FIG. 1 shows the arrangement of the complete information processing system in accordance with the invention. The system comprises: loop transmission lines 1, 2 for circulating data to be stored; a plurality of transmission control processors 11, 12, 13 and 21 to 28 each having the same structure and disposed on the corresponding loops; control units 31 to 33 and 41 to 45 for sending processed data onto the loop transmission lines and processing the data read out from the loop transmission lines; bi-directional transmission lines 51 to 53, 61 to 63 and 71 to 75 connecting transmission control processors to the corresponding control units in pairs; and bi-directional transmission lines 81 to 85 connecting the control units to corresponding external terminal devices (not shown). The control units 31 to 33 and the control units 41 to 45 will be referred to as "level 1 control units" and "level 2 control units", respectively. The level 2 control units 41 to 45 process data collected from the external terminal devices and send the processed data to the corresponding transmission control processors 21 to 25 on loop 2 in order to store the processed results. In addition, the level 2 control units 41 to 45 collect necessary data from loop 2, process it, then send the results to the corresponding external terminal devices. Similarily, the level 1 control units 31 to 33 select as well as collect from the data flowing around loop 2 important data or other data that is required to be stored for a long period of time, process it, then send the results to loop 1. The level 1 control units 31 to 33 are also able to select and fetch desired data from the data flowing around loop 1 and then make the selected data flow around loop 2.

The method of fetching desired data from the transmission control processors 11 to 13 or 21 to 25 by the control units 31 to 33 or 41 to 45 will be described hereinunder with reference to FIGS. 2 to 7.

Figure 2:
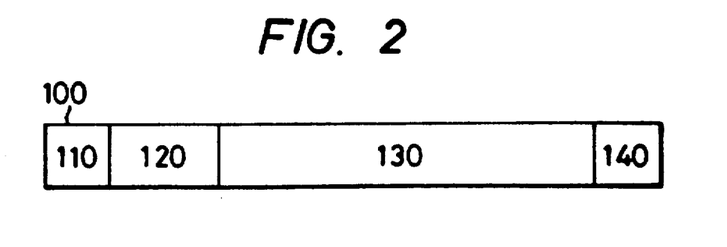
FIG. 2 shows an example of the format of data stored in the system of FIG. 1.

FIG. 2 shows a format 100 of a message flowing around a loop 1 or 2. The message 100 consists of the following fields: a start flag 110, an end flag 140, a content code 120 representing the contents of the data, and data 130. The content code 120 is given in the control units 31 to 33 or 41 to 45 where the data 130 was generated. Each of the transmission control processors 11 to 13 and 21 to 28 reads the content code 120 of the message 100 flowing around the corresponding loop to judge whether that processor should receive the message 100 or not. Which message each transmission control processor should receive is decided in accordance with content codes previously registered in a table in each transmission control processor from the corresponding control unit. The transfer of data from the loops and external terminal devices, and the registration of content codes in the transmission control processors, by the control units are carried out as follows.

Figure 3:
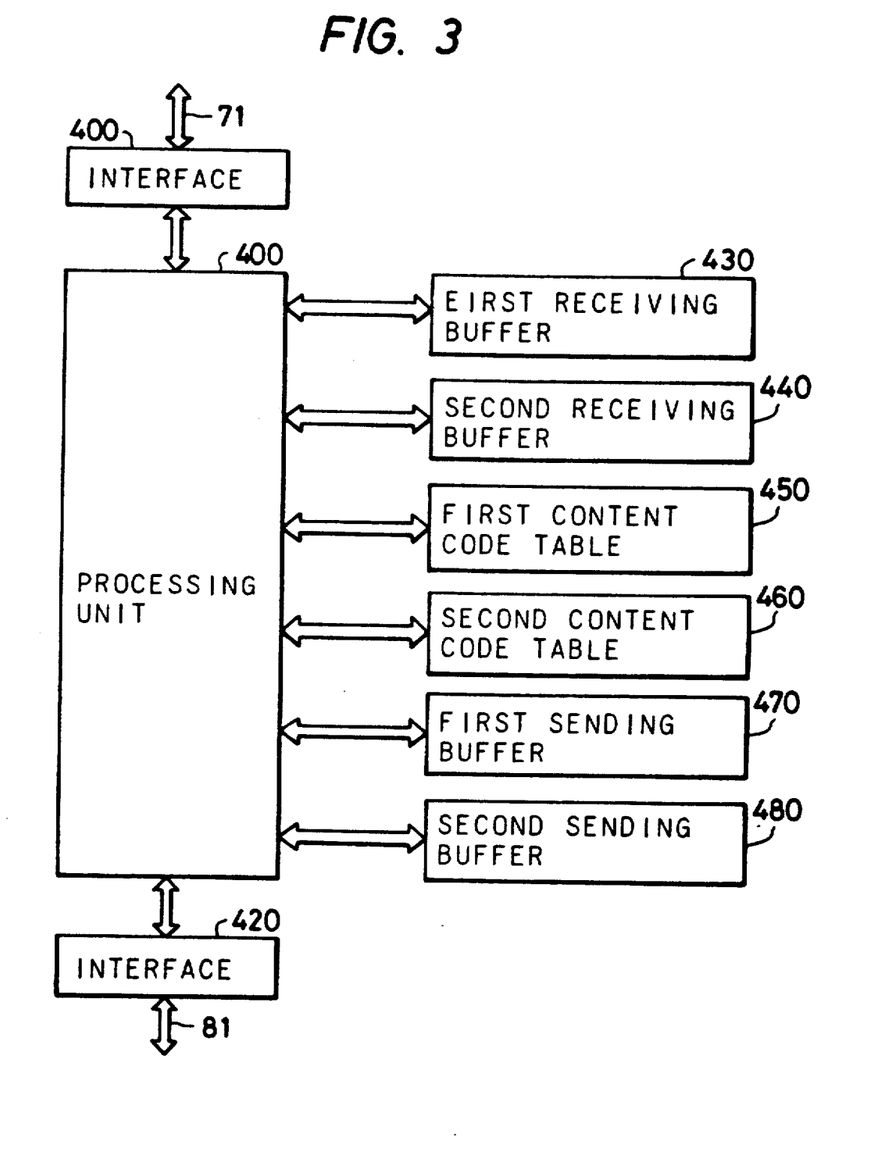
FIG. 3 shows a detailed example of the arrangement of control units of the system of FIG. 1.

FIG. 3 shows an example of a practical construction of one of the control units, for example the control unit 41. The unit comprises a processing unit 400, an interface 410 for connection with the transmission control processor 21, and an interface 420 for connection with the corresponding terminal device. In a level 1 control unit, the interface 420 is an interface for connection with the corresponding transmission control processor on the loop 2 side. The control unit further comprises memory devices. The memory devices constitute a first receiving buffer 430 for storing data received through the interface 410, a second receiving buffer 440 for storing data received through the interface 420, a first content code table 450 for storing the content codes of data to be received through the interface 410, a second content code table 460 for storing the content codes of data to be received through the interface 420, a first sending buffer 470 for storing data to be sent through the interface 410, and a second sending buffer 480 for storing data to be sent through the interface 420.

When the power is turned on or when a content code of the data to be received is changed, the processing unit 400 of the control unit 41 sends the data in the first content code table 450 to the transmission control processor 21 through the interface 410. For the level 1 control units, e.g., the control unit 31, moreover, the data in the second content code table 460 is sent to the corresponding transmission control processor 28 through the interface 420.

Figure 4:
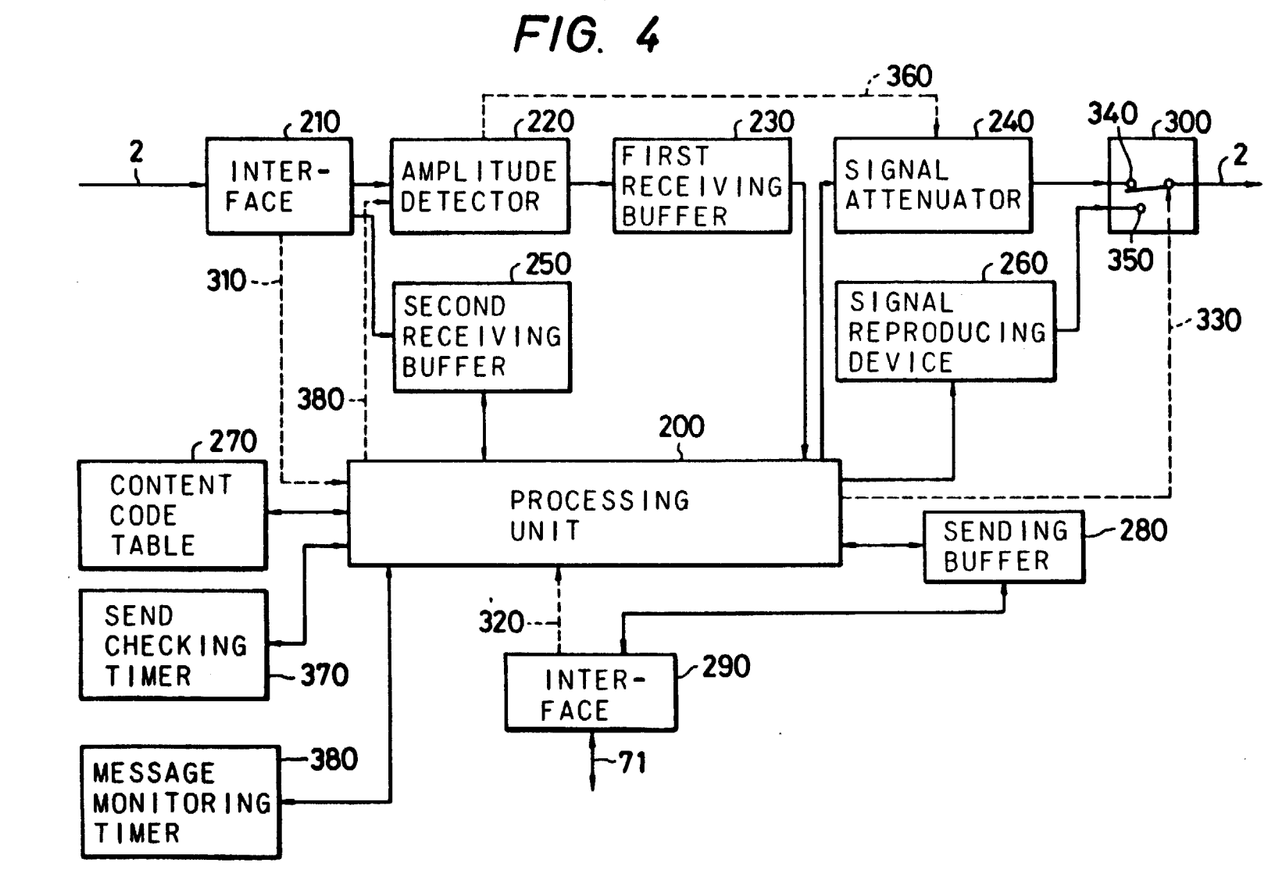
FIG. 4 shows a detailed example of the arrangement of the transmission control processor in the system of FIG. 1.
Figure 7A:
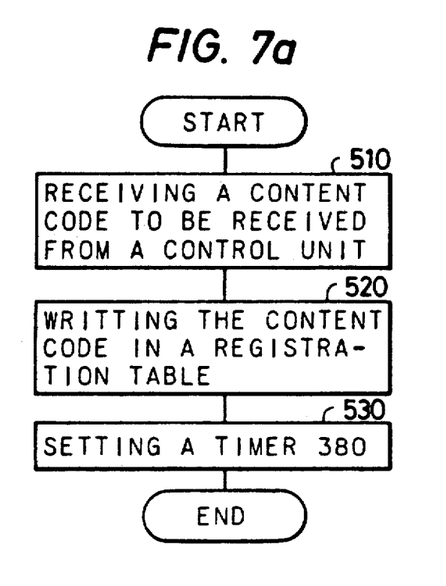
FIGs. 7a to 7g are each flow charts showing examples of the operations of the transmission control processors of FIG. 4.
Figure 7B:
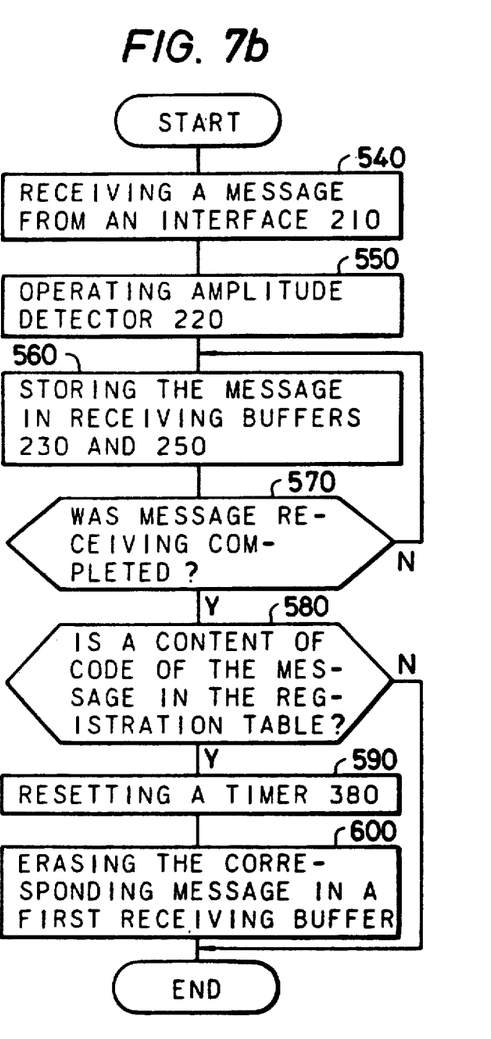
Figure 7C:
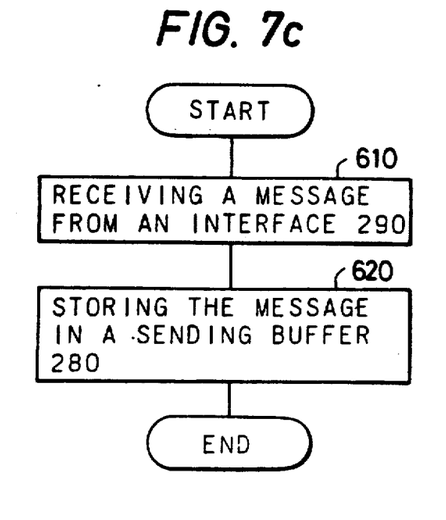

A processing unit 200 of the transmission control processor shown in FIG. 4 writes the content code of a message to be received, which has been sent from the control unit 41, into a content code registration table 270 in the transmission control processor 21 shown in FIG. 4 and sets a message monitoring timer (T$_2$) 380 {see blocks 500 to 520 of FIG. 7a}. The transmission control processor 21 fetches the message 100 received from loop 2 when the content code 120 in the message 100 is the same as any one of the codes registered in the content code registration table 270, and sends the received message to the control unit 41 side through the interface 290. A message fetched by the control unit 41 via the interface 410 is stored in the first receiving buffer 430 by the processing unit 400. Similarly, a message fetched from an external terminal device (the corresponding transmission control unit in the case of a level 1 control unit) via the interface 420 is stored in the second receiving buffer 440. When a message is stored in either of the first and second receiving buffers 430, 440, the processing unit 400 carries out the processing in accordance with the content code and the data, and then erases the corresponding message in the buffer 430 or 440. The result of the data processing is stored in either of the first and second sending buffers 470, 480 according to the direction in which the result should be sent. When there is already a message in either of the first and second sending buffers 470, 480, the processing unit 400 outputs the message via the interface 410 or 420 and then erases the corresponding message in the buffer 470 or 480.

How a message sent from a control unit is sent onto the corresponding loop from the corresponding transmission control processor, how data on a loop is fetched by a transmission control processor and transferred onto the other loop, and how unwanted data is erased will be described hereinunder with reference to FIG. 4 which shows the arrangement of each of the transmission control processors. It must be noted that all of the transmission control processors 11 to 13, and 21 to 28 have the same arrangement, the transmission control processor 21 will be taken as an example for description here.

A message sent from loop 2 is sent through the interface 210 to an amplitude detector 220 which measures the signal amplitude of the message and a second receiving buffer 250 which temporarily stores the message. The message which has passed through the amplitude detector 220 is stored in a first receiving buffer 230. The transmission control processor 21 comprises the processing unit 200 for controlling the transmission control processor, an interface 290 for fetching messages sent from the control unit 41, a sending buffer 280 for storing the messages, a content code registration table 270 for storing the content codes of data to be received, a signal attenuator 240 for attenuating the signal level of a message to be output to loop 2, a signal reproducing device 260 for regenerating the signal level of a message to be output to loop 2 into a reference value, a switch 300 for selectively sending either of the outputs of the signal attenuator 240 and the signal reproducing device 260 onto loop 2, and a checking timer 370 for determining the transmission timing of the message. In FIG. 4, control signals 310, 320 from the interfaces 210, 290 to the processing unit 200, a control signal 330 from the processing unit 200 for controlling the switch 300, a control signal 360 from the amplitude detector 220 so as to inform the signal attenuator of the amplitude of a signal received from loop 2, and a control signal 382 for starting the amplitude detector are each shown by dotted lines.

The operation in the transmission control processor 21 is as follows. When a message is sent from loop 2, the interface 210 sends the message to the amplitude detector 220 and the second receiving buffer. In this case, when it detects the flags 110 and 140 of the message 100, the interface 210 outputs control signals 310 indicating that a message has been received, and that the reception of the message has been completed. When it learns from the control signal 310 that a message has been received, the processing unit 200 starts the amplitude detector 220 {see blocks 540, 550 of FIG. 7b}. The amplitude detector 220 measures the amplitude A$_{s0}$ of the received signal and sends a signal 360 indicating the measured value A$_s$ to the signal attenuator 240 and also stores the message in the first receiving buffer 230 {see blocks 560, 570 of FIG. 7b}. The processing unit 200 checks to see whether the content code 120 of the message 100 stored in the first or second receiving buffer has been registered in the content code registration table 270 {see block 580 of FIG. 7b}, and if the content code 120 has been registered, the processing unit 200 resets the timer 370 (T$_2$), fetches the message from the second receiving buffer 250, and erases the corresponding message in the first receiving buffer 230 {see blocks 590, 600 of FIG. 7b}. In addition, when the processing unit 200 receives the signal 310 indicating the end of the message from the interface 210, the processing unit 200 sets a message transmission checking timer (T$_1$) 370. Similarly, when a message is sent to the interface 290 from the control unit 41 over a data bus 71, signals 320 representing the start and end of the reception of the message are transmitted from the interface 290 to the processing unit 200. At the same time, the interface 290 sends the received message to the sending buffer 280 {see blocks 610, 620 of FIG. 7c}.

Figure 7D:
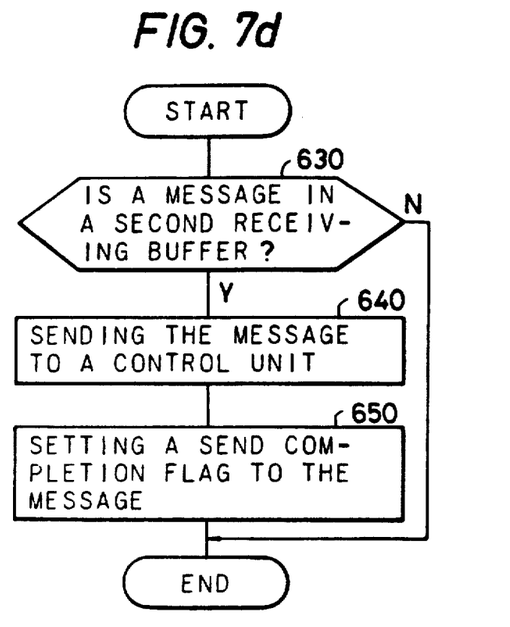
Figure 7E:
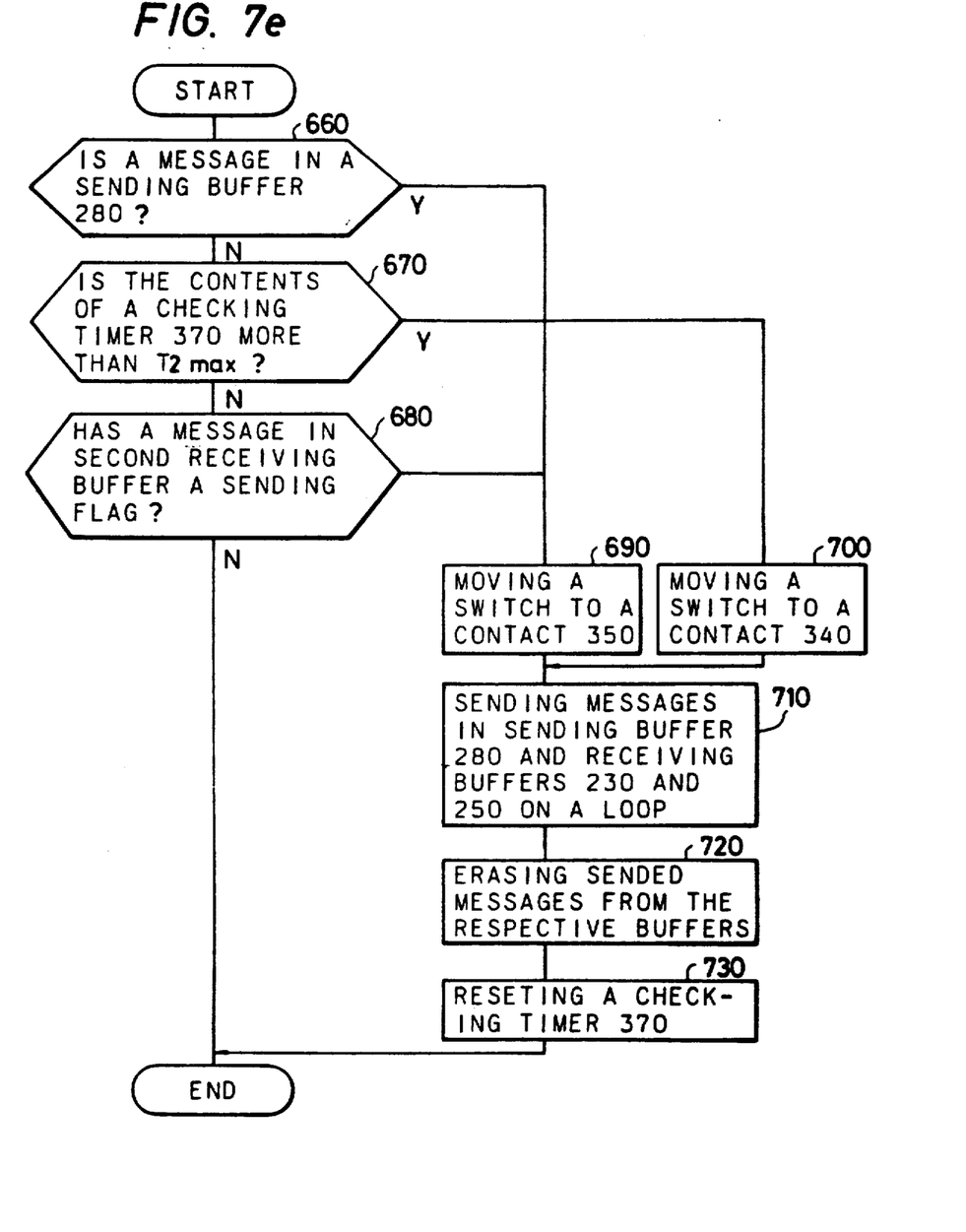

When a message has been input to the second receiving buffer 250, and if the message is one that should be received, the processing unit 200 sends the message to the control unit 41 through the interface 290 and sets a bit indicating completion of sending in a flag area corresponding to the sent message in the second receiving buffer 250 {see blocks 630 to 650 of FIG. 7d}. When there is already a message in the sending buffer 280, the processing unit 200 outputs the message to loop 2 {see blocks 660, 690, 710 of FIG. 7e}. For the message in the second receiving buffer 250, at the instant that the value of the transmission checking timer (T$_1$) exceeds a predetermined value T$_{lmax}$, the message in the second receiving buffer 250 whose flag indicating completion of sending has already been set is sent out onto loop 2 {see blocks 670 to 710 of FIG. 7e}. The sending of the message in the second receiving buffer is performed after the sending of all the messages in the sending buffer 280 has been completed. After the message in the second receiving buffer has been sent, if there is also a message in the first receiving buffer 230, it is sent too. When sending a message from the sending buffer 280 or the second receiving buffer 250 onto loop 2, the processing unit 200 outputs the message to the signal regenerating device 260 and also generates the control signal 330 so that the switch 300 is connected to the side of a contact 350. Similarly, when sending a message from the first receiving buffer, the processing unit 200 output the message to the signal attenuator 240 and also generates the control signal 330 so that the switch 330 is connected to the side of a contact 340. On the completion of the sending of the message onto loop 2, the processing unit 200 erases the messages, which have already been sent, from the buffers 280, 250, 230, and resets the transmission checking timer 370 corresponding to each message {see blocks 720, 730 of FIG. 7e}.

The signal amplitude conversion operations effected by the signal attenuator 240 and the signal reproducing device 260 will be described hereinunder with reference to FIGS. 5 and 6, respectively.

Figure 5A:
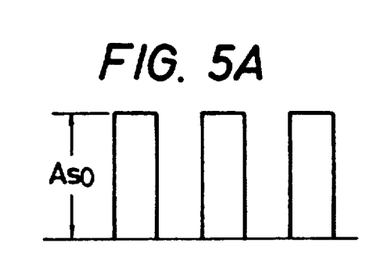
FIGS. 5a and 5b illustrate the operations of a signal attenuator and FIGS. 6a and 6b illustrate the operations of a signal regenerating device of FIG. 4.
Figure 5B:
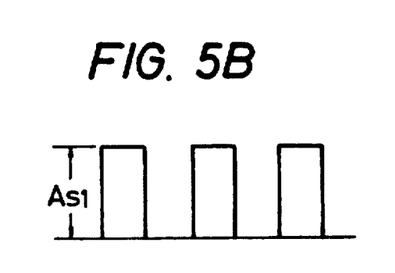

Assume that a signal input from a loop has reached the amplitude detector 220 and the value of the amplitude thereof has been detected as A$_{sO}$ as shown in FIG. 5(A). The signal attenuator 240 multiplies the input signal by a predetermined attenuation factor r$_2$ to convert the signal into a signal of amplitude A$_{sl}$ $$A_{sl} = A_{sO} r_2$$

as shown in FIG. 5(B) and sends out the converted signal. If it is assumed that the signal amplitude of the message sent onto the loop for the first time is A$_{s2}$, and the attenuation factor of a signal between each of the transmission control processor is α, then the amplitude A of the message sent to the loop transmission line after having to pass through the signal attenuator 240 in each of n transmission control processors is:

$$A = A_{s2}(1 - n\alpha r_2)$$

Therefore, if the threshold value of the amplitude at which the interface 210 is able to identify signals is assumed to be $\bar{A}$, the interface 210 is unable to identify messages when the following condition is satisfied:

$$A < \bar{A}$$

and such messages are regarded as noise and are erased.

Figure 6A:
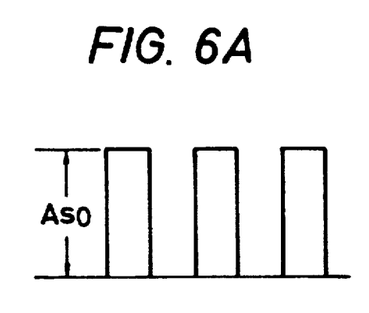
Figure 6B:
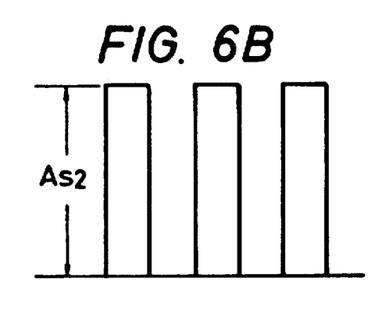

On the other hand, regardless of the amplitude A$_{sO}$ (A$_{sO} \geq \bar{A}$) of a signal input from a loop which is shown in FIG. 6(A), the signal reproducing device 260 regenerates the input signal into a signal having an amplitude of initial value A$_{s2}$ shown in FIG. 6(B) and outputs the reproduced signal.

As will be obvious from the above, the amplitude of a message on a loop is attenuated every time the message passes through a transmission control processor, and dies out in the course of the transmission, unless the message is received by a transmission control processor and fetched by the corresponding control unit. However, since a message being repeatedly received is subjected to signal amplitude reproduction in each of the transmission control units each time the message is received, such a message can be stored on a loop for a long period of time.

In the system described above, if important information amongst that flowing around loop 2 is stored on loop 1, if the number of transmission control processors connected to loop 1 is made smaller than that of transmission control processors connected to loop 2, and if the attenuator factor r$_1$ of the signal attenuator 240 in each transmission control processor on loop 1 is made smaller than the attenuation factor r$_2$ of the signal attenuator in each transmission control processor on loop 2, then the message storage period on loop 1 can be made longer than that on loop 2.

Figure 7F:
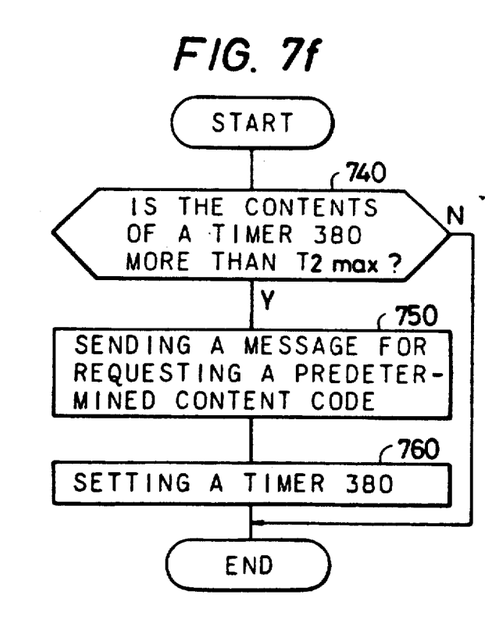
Figure 7G:
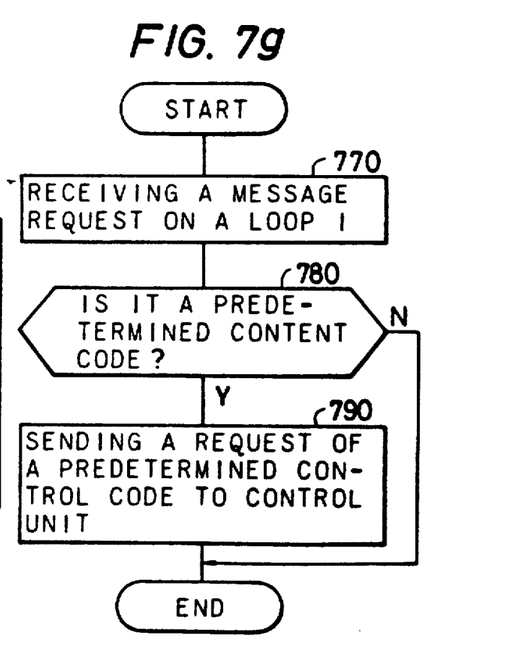

It must be noted that when any one of the level 2 control units 41 to 45 requires a message having a predetermined content code FC$_1$ and if the message cannot be found on loop 2 even after a predetermined time T$_{2max}$ has elapsed on the timer T$_2$, the corresponding transmission control processor 21 to 25 requests any of the transmission control processors 26 to 28, via loop 2, to output the message having the content code FC$_1$ and resets the timer T$_2$ {see blocks 740 to 760 of FIG. 7f}. Assuming that the transmission control processor 26 is in charge of the content code FC$_1$, the transmission control processor 26 registers the code FC$_1$ in the content code registration table 270 of the transmission control processor 13 through the control unit 33. If there is a message with the content code FC$_1$ on loop 1, the message is read out onto loop 2 through the transmission control processor 13, the control unit 33 and the transmission control processor 26 and is then fetched by any one of the control unit 41 to 45 which has requested the message via the corresponding transmission control processor 21 to 25 {see blocks 770 to 790 of FIG. 7g}.

As will be fully understood from the foregoing description, the information processing system of the invention enables the storage and read out of a message without any knowledge of the storage address of the message. Moreover, a message with a higher use frequency or degree of importance can be preserved for a long period of time; but messages lower in use frequency or degree of importance are made to die out in the course of time, thereby allowing a control on the quantity of data stored.

What is claimed is:

1. An information processing and storage system comprising:
   means in the form of a first signal transmission line for effecting transmission of data for purposes of storing that data;
   first means connected to said first signal transmission line for inputting and outputting data to and from said first signal transmission line; and
   second means connected to said first means for selectively fetching data from said first signal transmission line via said first means without eliminating the fetched data from said first signal transmission line;
   said first means including third means for controlling the storage of data on said first signal transmission line by controlling the period of storage of data on said first signal transmission line in accordance with whether or not said data is fetched by said second means.

2. An information processing and storage system according to claim 1, further comprising:
   means in the form of a second signal transmission line for effecting transmission of data for purposes of storing that data; and
   fourth means connected to said first means and said second signal transmission line for selectively transferring data on said first signal transmission line received from said first means to said second signal transmission line, as well as effectively transferring data on said second signal transmission line via said first means to said first signal transmission line.

3. An information processing and storage system according to claim 2, wherein said fourth means includes fifth means for controlling the time of storage of data on said second signal transmission line by maintaining said data as stored data on said second signal transmission line only under the condition that said data is being accessed for transfer to said first signal transmission line.

4. An information processing and storage system comprising:
   means in the form of a first loop-shaped signal transmission line for effecting transmission of data for purposes of storing that data;
   first means connected to said first signal transmission line for inputting and outputting data to and from said first signal transmission line; and
   second means connected to said first means for selectively fetching data from said first signal transmission line via said first means;
   said first means including third means for controlling the storage of data on said first signal transmission line by controlling the period of storage of data on said first signal transmission line in accordance with the frequency of fetching of the data by said second means so that the period of storage becomes longer as said frequency is increased.

5. An information processing and storage system according to claim 4, wherein a plurality of first means are connected to said first signal transmission line and each of said first means includes processor means for controlling said second means and said third means independent to operations of processor means included in other first means.

6. An information processing and storage system according to claim 4, wherein said data is transmitted with a content code which represents the received data, and said second means includes means for controlling said selective fetching on the basis of said content code in the data received from said transmission line.

7. An information processing and storage system comprising:
   means in the form of a first loop-shaped signal transmission line for effecting transmission of data for purposes of storing that data;
   first means connected to said first signal transmission line for inputting and outputting data to and from said first signal transmission line; and
   second means connected to said first means for selectively fetching data from said first signal transmission line via said first means;
   said first means including third means for controlling the time of storage of data on said first signal transmission line by selectively and progressively attenuating the signal amplitude of data each time it flows around said first signal transmission line in accordance with whether or not the data is fetched by said second means during a cycle around said first signal transmission line, so that data is not attenuated in amplitude by said third means so long as it is fetched by said second means.

8. An information processing and storage system according to claim 7, further comprising:
   means in the form of a second signal transmission line for effecting transmission of data for purposes of storing that data; and
   fourth means connected to said first means and said second signal transmission line for selectively transferring data on said first signal transmission line received from said first means to said second signal transmission line, as well as selectively transferring data on said second signal transmission line via said first means to said first signal transmission line.

9. An information processing and storage system according to claim 8, wherein said fourth means includes fifth means for controlling the time of storage of data on said second signal transmission line by attenuating the signal amplitude of data flowing around said second signal transmission line only when the data on said second signal transmission line is not accessed for transfer to said first signal transmission line.

10. An information storage system comprising:
    first means in the form of a first signal transmission line for effecting transmission of data for purposes of storing that data;
    second means in the form of a second signal transmission line effecting transmission of data for purposes of storing that data;
    third means connected to said first signal transmission line for selectively fetching data from said first signal transmission line;
    fourth means connected to said first and second signal transmission lines for selectively transferring data from said first signal transmission line to said second signal transmission line; and
    fifth means for controlling the time of storage of data on said first signal transmission line on the basis of a frequency of fetching of data by said third means so that said time of said storage of data is longer as said frequency of fetching increases.

11. An information storage system comprising:
    first and second means in the form of first and second signal transmission lines for effecting transmission of said data for purposes of storing that data, respectively, wherein the storage time of said second means is longer than that of said first means;

third means connected to said first means for selectively fetching data from said first means;

fourth means connected to said first and second means for selectively transferring data between said first and second means so that selected data among data stored on said first means is stored in said second means; and fifth means for controlling the time of storage of data by said first means on the basis of a frequency of fetching of data by said third means so that the time of storage is longer as said frequency of fetching increases.

12. An information processing and storage system comprising:

means in the form of a first signal transmission line for effecting transmission of data for purposes of storing that data; and first means connected to said first signal transmission line for selectively fetching data from said first signal transmission line;

said first means including second means for controlling the time of storage of data on said first signal transmission line on the basis of the frequency of fetching of data by said first means, so that the time of storage of data becomes longer as the frequency of said fetching increases.

13. An information processing and storage system according to claim 12, wherein said data is transmitted with a content code representing the content of the data and said first means includes means for selectively fetching data on the basis of said content code in the data received from said signal transmission line.

14. An information processing and storage system according to claim 13, wherein said first means includes means for processing fetched data.

15. An information processing and storage system according to claim 12, wherein said first means includes means for processing fetched data.

16. An information processing and storage system according to claim 1, wherein said period of storage increases as said frequency of fetching increases.

17. An information processing and storage system according to claim 1, wherein said data fetching is effected for automatically controlling the amount of said data stored.

* * * * *